March 8, 1960 N. H. YOUNG, JR 2,928,051
ELECTRIC AMPLIFIER CONTROL
Filed Sept. 12, 1957
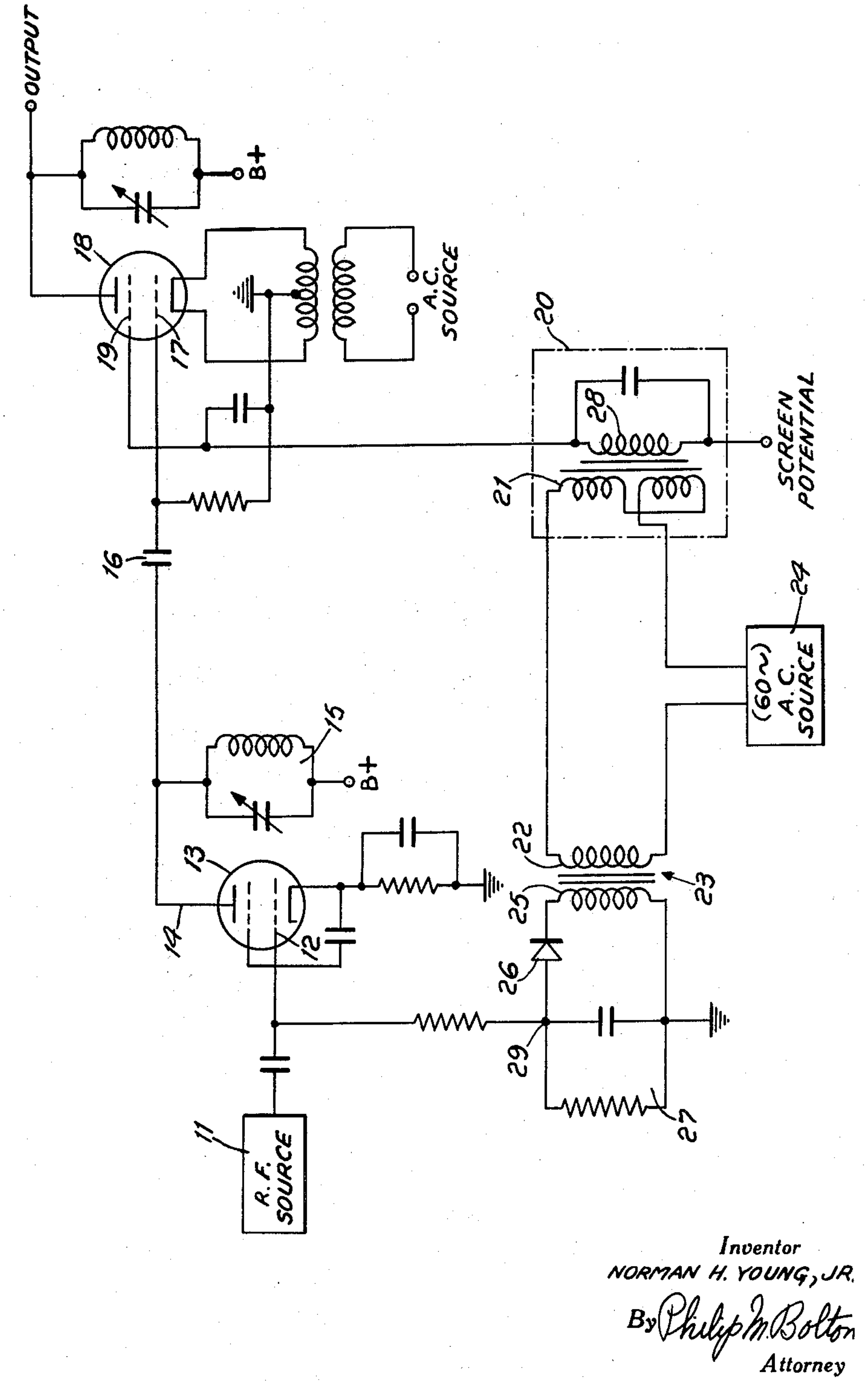
Inventor
NORMAN H. YOUNG, JR.
By Philip M. Bolton
Attorney United States Patent Office 2,928,051

Patented Mar. 8, 1960

2,928,051

ELECTRIC AMPLIFIER CONTROL

Norman H. Young, Jr., Nutley, N.J., assignor to International Telephone and Telegraph Corporation, Nutley, N.J., a corporation of Maryland Application September 12, 1957, Serial No. 683,596

2 Claims. (Cl. 330—128)

This invention relates to an electronic amplifier control circuit.

In radio frequency power amplifiers which are used over a wide range of frequencies, it is normal for the amount of drive to the control grid of the final stage to vary from frequency to frequency within the band. This variation is often undesirable, since low amounts of drive will produce less than normal output and, when using a tetrode or other multi-grid devices for a final amplifier tube, high amounts of drive will result in excessive screen current and damage to the tube. The consideration of excessive screen current and the resulting tube damage very often gives rise to a limitation on the circuit output. For example, most circuits in which modern power tubes are used are limited by the critical value of screen power dissipation. At a fixed screen supply voltage, this limit may be established at a known value of screen current.

There has been some attempt to adapt the screen current as a controlling parameter. Relays have been employed which are energized by the screen current, opening their contacts and cutting off power to the particular stage of interest. This solution in its various forms has certain disadvantages. It involves the mechanical operation of a relay with its inherent disadvantages of time delay in operation and possibility of malfunction. Most important, it renders the particular stage inoperative at least for a moment. Furthermore, it does not allow the circuit to work as close to maximum output as possible since the relay can only assume an "on or off" condition, instead of providing for a continuously variable control.

While utilization of screen current as a means of controlling the amount of excitation to a final amplifier tube or to any particular stage tube of a multi-stage amplifier arrangement is desirable, one drawback to a simple solution of this nature is the fact that the controlling phenomeon is a current rather than a voltage. This current, furthermore, may be measured only at a point having potential far from ground. While an easy means to effect a control for a particular stage is by changing the bias applied to the control grid of a preceding amplifier stage, there is requisite a means for translating this changing screen current to a varying voltage value to obtain the proper control. In addition, freedom to connect the positive terminal of this varying voltage source to ground or to any desired reference bias is essential.

It is therefore an object of the present invention to provide an improved amplifier control arrangement.

It is a further object of the present invention to provide an amplifier control arrangement which will not have the inherent disadvantages that accompanying mechanically moving components.

It is still a further object of the present invention to provide an amplifier control system which will allow the system to operate relatively close to maximum output by relating the output of a preceding stage in a continuously variable fashion to control the excitation to a particular stage in proportion to the current flowing to a particular electrode.

In accordance with a main feature of the present invention there is provided a controllable voltage source for excitation of any particular amplifier stage, with said source being continuously responsive to the current flowing to a selected electrode of the amplifier of said particular stage.

Another feature in conjunction with the main feature above is the provision of a saturable reactor means coupled to be responsive to the above mentioned current and having its output coupled to the above-mentioned controllable voltage source to provide a means to effect the continuous variable control of the voltage source.

The foregoing and other objects and features of this invention and the manner of attaining them will become more apparent and the invention itself will be better understood by reference to the following description of an embodiment of the invention taken in conjunction with the accompanying drawing in which the figure is a schematic circuit and block diagram showing two stages of a multi-stage amplifier arrangement controlled through a saturable reactor.

In the figure, the R.F. (radio frequency) signal to be amplified is derived from a source 11 which may be either the original source or from some prior stage of amplification. This R.F. voltage is applied to the grid of the tetrode 13 to produce an amplified output at plate 14, which is applied to the tank circuit 15 and coupled to the next stage by the condenser 16. This R.F. signal is applied to the control grid 17 of the final amplifier stage represented by tetrode 18. The screen grid current of the screen grid 19 has a predetermined value, beyond which it is unsafe to operate the tube, and the core of the saturable reactor 20 is designed such that saturation is attained when the screen grid current is close to said value, such as for example about 95 percent. Shunting devices may be used to adjust the saturation characteristics of the saturable reactor if necessary. The A.C. (alternating current) winding 21 is placed in series with the primary winding 22 of a second transformer 23. Both of the windings 21 and 22 are connected to any convenient A.C. voltage source, such as a 60 cycle supply 24. The output from the secondary 25 of the transformer 23 is rectified by the diode 26 and passed to the load circuit 27 which acts as an averaging or integrating means. As saturation of the core is approached by the screen grid current flowing through the winding 28, the impedance of winding 21 for the 60 cycle current gradually approaches a value much smaller than the primary impedance of transformer 23. The diminution of the impedance factor of the coil 21 allows a larger current flow through the transformer primary winding 22 and hence induces a larger voltage in the secondary 25. A larger current flow around the secondary loop through the diode 26 and the load circuit 27 causes the potential at point 29 to become more negative. Obviously, the more negative the potential at 29, the more negative will be the potential of the grid 12 and hence a reduction in the positive gain at anode 14. Conversely, it follows that a small screen current flow through the winding 28 will result in a small induced current at 25 and hence the point 29 and the grid 12 will move in a positive direction toward ground potential causing a relatively large gain at the anode 14. As is well known, in saturable reactor devices there is a minimum of inductive coupling between the A.C. winding and the D.C. winding which would prevent the 60 cycle power from producing a "hum" on the amplifier 18.

In the preferred embodiment a saturable reactor in combination with a second transformer is used as the control means. Other switching devices might be used, such as a relay, to either cause a predetermined lower potential to be applied to the grid 12 or to cause the output from 14 to be interrupted. The variable voltage available at 29 may be used in a variety of ways to control the gain of amplifier stages or the loss introduced by attenuation in the signal. The embodiment shown is preferred because the limitation to the lower stage is not abrupt as with a relay device which often gives rise to erratic control and spurious signals and would require filtering components to compensate for the spurious signals. As mentioned above a relay arrangement would limit operating the system close to maximum output, give a period of non operation and has a mechanical movement time delay. The saturable reactor provides an isolation device as well as a sensing device.

While I have described above the principles of my invention in connection with specific apparatus, it is to be clearly understood that this description is made only by way of example and not as a limitation to the scope of my invention as set forth in the objects thereof and in the accompanying claims.

I claim:

1. A control system in a multi-stage electronic amplifier arrangement comprising at least first and second tetrode tubes, first and second frequency resonant circuits respectively coupled to the anodes of said first and second tetrode, a saturable reactor, a transformer, circuitry means coupling the screen grid of said first tetrode to a first winding of said saturable reactor, and an alternating current voltage source coupled in series to a second winding of said saturable reactor and a first winding of said transformer, a second winding of said transformer series coupled to a rectifier means and a load device, the control grid of said second tetrode series coupled through said load device to a first reference potential, the screen grid and the cathode element of said second tetrode series coupled through an impedance circuitry to said first reference potential, a voltage source coupled to the control grid of said second tetrode to provide excitation thereto, circuitry means coupling the anode of said second tetrode to the control grid of said first tetrode to provide excitation thereto in accordance with the output therefrom.

2. A control system in a multi-stage electronic amplifier arrangement comprising at least first and second tetrode tubes, a saturable reactor, a transformer, circuitry means coupling the screen grid of said first tetrode to a first winding of said saturable reactor, and an alternating current voltage source coupled in series to a second winding of said saturable reactor and a first winding of said transformer, a second winding of said transformer series coupled to a rectifier means and a load device, the control grid of said second tetrode series coupled through said load device to a first reference potential, the screen grid and the cathode element of said second tetrode series coupled through an impedance circuitry to said first reference potential, a voltage source coupled to the control grid of said second tetrode to provide excitation thereto, circuitry means coupling the anode of said second tetrode to the control grid of said first tetrode to provide excitation thereto in accordance with the output therefrom.

References Cited in the file of this patent

UNITED STATES PATENTS

| | | |
|---|---|---|
| 2,615,977 | Sziklai et al. | Oct. 28, 1952 |
| 2,662,125 | Stafford | Dec. 8, 1953 |
| 2,694,114 | Kalfaian | Nov. 9, 1954 |
| 2,703,825 | Macdonald | Mar. 8, 1955 |